J. N. DAVIS.
SUBCASING OR INNER TIRE PROTECTOR FOR PNEUMATIC TIRES.
APPLICATION FILED MAY 22, 1916.
1,250,100. Patented Dec. 11, 1917.
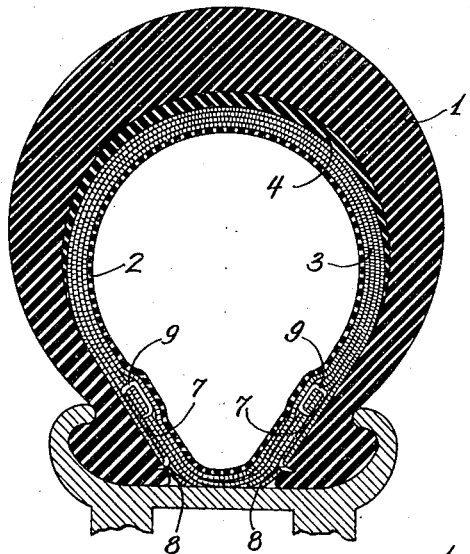
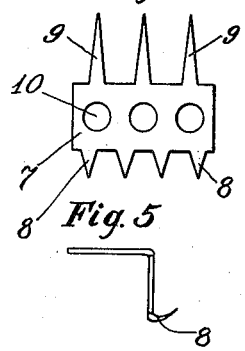
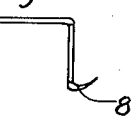
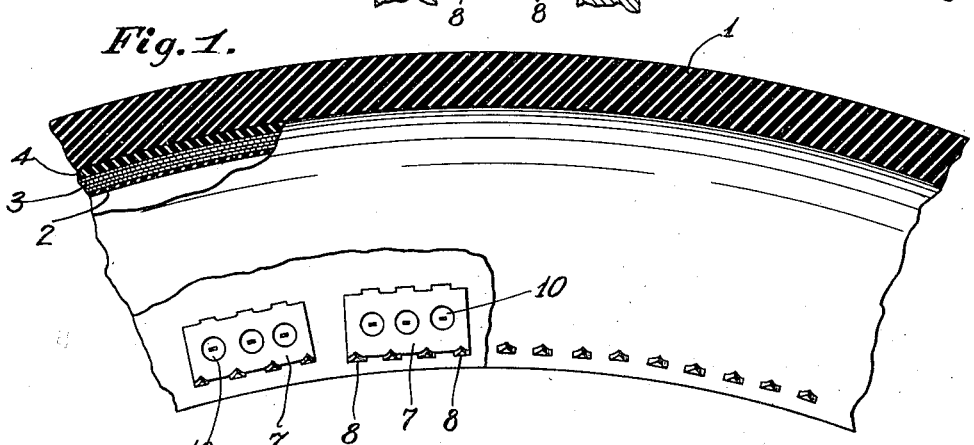
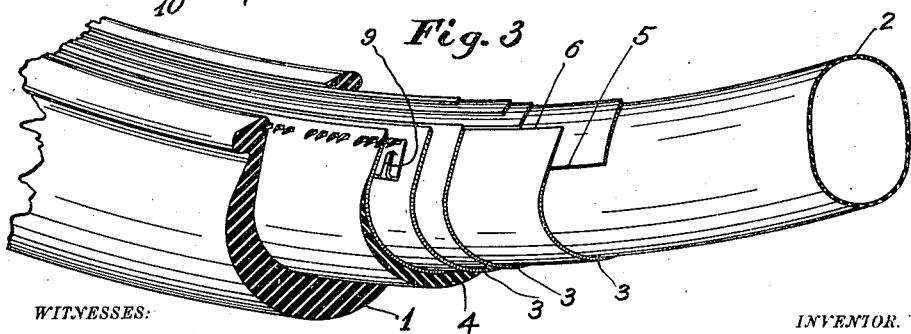
WITNESSES: Mary E Davis. Ida L Davis
INVENTOR. Jasper N Davis

UNITED STATES PATENT OFFICE.

JASPER N. DAVIS, OF DENVER, COLORADO.

SUBCASING OR INNER-TIRE PROTECTOR FOR PNEUMATIC TIRES.

1,250,100.     Specification of Letters Patent.     Patented Dec. 11, 1917.

Application filed May 22, 1916. Serial No. 99,110.

*To all whom it may concern:*

Be it known that I, JASPER N. DAVIS, a citizen of the United States of America, residing at the city and county of Denver and State of Colorado, have invented a new and useful Improvement in Subcasing or Inner-Tire Protectors for Pneumatic Tires, of which the following is a specification.

This invention relates to improvements in sub-casing or inner tire protectors for pneumatic tires.

The object of the invention is:

First, to provide an inner tire protector for use in old tires, with means to hold it in position without creeping.

Second, to provide an inner tire protecting means that will hold any character of blow-out.

Third, to provide an inner tire protector made of any number of layers of soft flexible material, with metal anchoring hooks secured along its edges, which are adapted to engage the inner surface of the solid bead portion of a tire in which it is placed, and having a rubber covering vulcanized or otherwise secured to its outer surface.

These objects are accomplished by the construction illustrated in the accompanying drawings, in which:

Figure 1, is a vertical, sectional view of a portion of a tire provided with the improved inner tire protector and broken away to show the construction and relative positions of the tire, the protector, the inner tube and anchoring hooks.

Fig. 2, is a transverse, sectional view of Fig. 1.

Fig. 3, is a perspective view, showing a portion of an outer tire, the inner tube, and the anchoring hooks, which engage the outer tire, the inner protector tire being so illustrated as to show the layers of fabric composing the same, the inner tube being also shown.

Fig. 4, is a plan view of a blank from which an anchor plate is formed.

Fig. 5, is an edge view of the anchor plate, after it has been formed ready to be attached to the inner tire protector.

Similar letters of reference refer to similar parts throughout the several views.

Referring to Figs. 1, 2 and 3, the numeral 1 designates the tire or outer casing, 2 the inner tube, and 3 the layers of fabric of the inner protector, which comes in between the inner tube 2 and the outer tire 1, and 4 the rubber covering or rubber tread of the protector. The protector is made up of any number of layers of suitable material, as cotton fabric, the same as tires are made of.

Referring to Fig. 3, the protector as shown, has four layers, the inner layer which surrounds the tube 2 being the longest in cross section. One edge 5 of the inner layer is in advance of the next layer, and the edge 6 of this layer overlaps the edge 5, as shown. This overlapping edge 6 is not for the purpose of giving the protector anti-bulging strength, but is for the purpose of preventing the inner tube from lying on the wheel rim, the rust of which is injurious to the tube. The remaining layers from the inner layer to the outer layer, are progressively shorter in cross section, thereby to reduce the thickness of the terminal edges of the inner tire, as will be understood by reference to Figs. 2 and 3. The inner tire is secured to the outer tire, by anchor plates 7, having anchoring hooks 8. The anchoring hook 8, as shown in Fig. 3, extends through the outer layer of the inner tire, and these hooks are adapted to enter the solid portion of the tire, near the edge of the bead, as shown in Fig. 2. It is not essential that the hooks should enter the tire at this particular point, but they may enter anywhere on the face of the bead.

In Fig. 1, the outer layer of fabric is broken away to show two of the anchor plates 7, from which the hooks 8 project, and are an integral part thereof. The metal anchor plates 7 are stamped from sheet steel, and are of the form shown in Fig. 4. They are then formed to the shape as shown in Fig. 5, before they are secured to the inner tire protector as illustrated in Figs 1, 2, and 3. The hooks 8 extend from the lower edge of the plate 7, and from the upper edge thereof extend hooks 9, which are preferably longer than the hooks 8, and are for the purpose of securing the plate 7 to two or more layers of the inner tire. The plates are secured to the protector by first forcing the prongs 9, Fig. 5, through one or more layers of the protector or inner tire fabric as desired, and then bending them over in such a way as to cause the points of the prongs 9 to pass the second time through the one or more layers of fabric at a point directly over apertures 10, which are formed in the plates. These apertures permit the points of the prongs 9 to enter in or through them, and if desired clamped on another side, as shown in Fig. 2, which enables the prongs to hold the said plates more firmly to the fabric. The plates 7 lie between the two outer layers of fabric, the object of this arrangement being to prevent the metal plates from lying against the outer tire; another reason being that the plates are held more secure to the said inner tire by reason of the outer layer of fabric overlapping the plates and the anchoring hooks 7, which hooks project through said layer, which laps over and is vulcanized to the remaining layers.

As above explained, the prongs 9 do not pierce through the inner layer, the said layer preventing the metal prongs 9 from coming in contact with the inner tube. The protector as described, may be also called a sub-casing, because it embodies all the requirements of a complete outer tire, the only difference being the addition of more layers of fabric, and a heavy rubber tread.

Having described my invention, what I claim as new, and desire to secure by Letters Patent, is:—

1. The combination with an inner endless protector for pneumatic tires, of an endless row of plates on opposite sides of said protector, having integral prongs which connect them with said protector, and integral prongs which are adapted to be embedded in the bead portion of the tire.

2. The combination with a tire having an inflatable inner tube, of an inner endless protector interposed between said tire and tube, and an endless row of plates on opposite sides of said protector, having integral prongs adapted to engage said protector, and outwardly bent prongs adapted to be embedded in the bead portion of said tire by the pressure of said inner tube when the same is inflated.

3. The combination with a tire having an inflatable inner tube, of an inner endless protector interposed between said tire and tube, having an endless row of plates inclosed in opposite sides of said protector provided with integral prongs which engage said protector, and outwardly extending integral prongs adapted to be embedded in the bead portion of said tire, when the inner tube is inflated.

4. The combination with a tire having an inflatable inner tube, of an inner endless protector interposed between said tire and tube, and an endless row of plates on opposite sides of said protector having apertures therein, and integral prongs which pass through said protector and are bent down and around and again passed through said protector so that their points enter said apertures, and outwardly bent integral prongs adapted to be embedded in the bead portion of said tire by the pressure of said inner tube when the same is inflated.

In testimony whereof, I affix my signature in the presence of two witnesses.

JASPER N. DAVIS.

Witnesses:
 MARY E. DAVIS,
 IDA L. DAVIS.